UNITED STATES PATENT OFFICE.

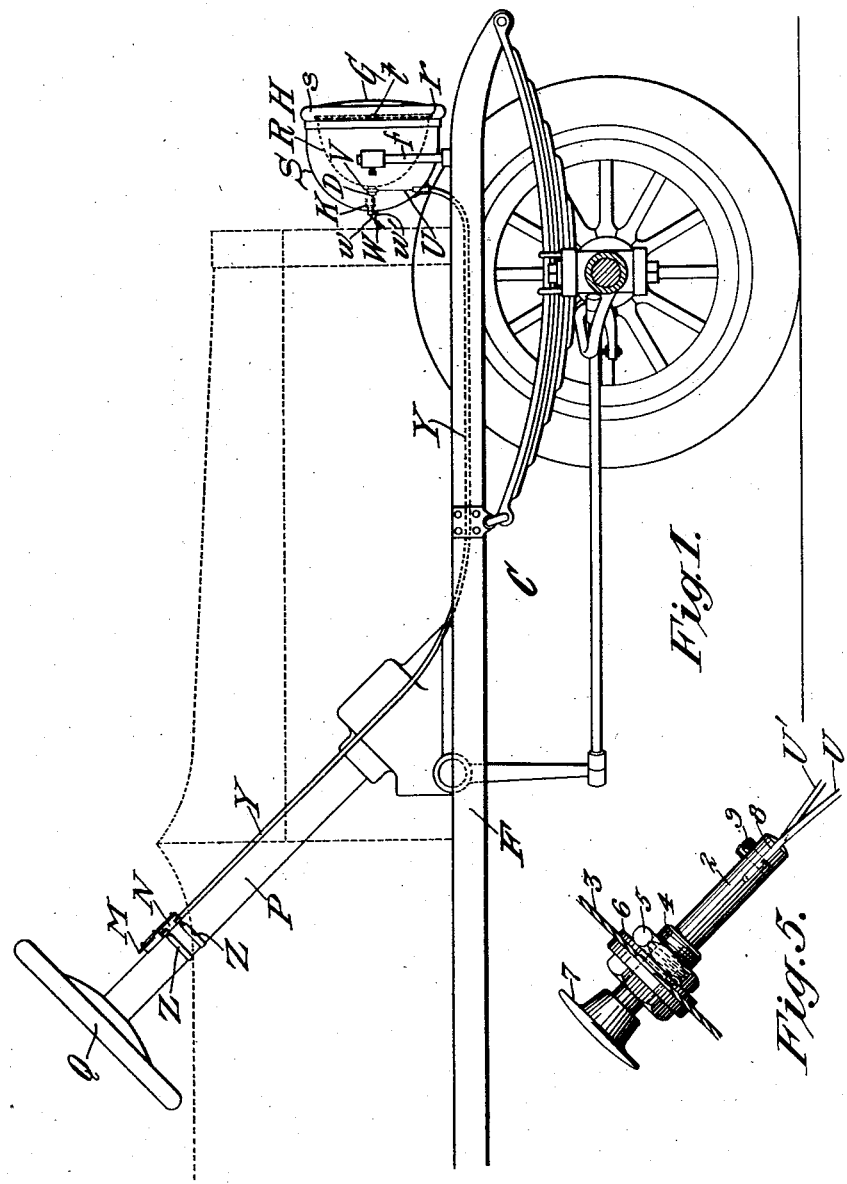

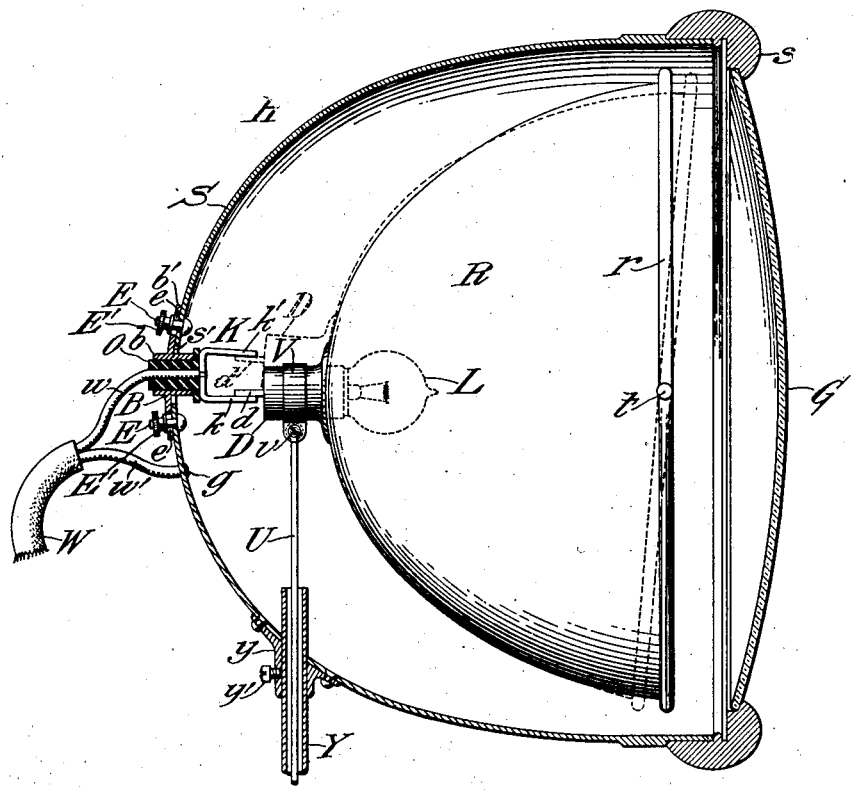
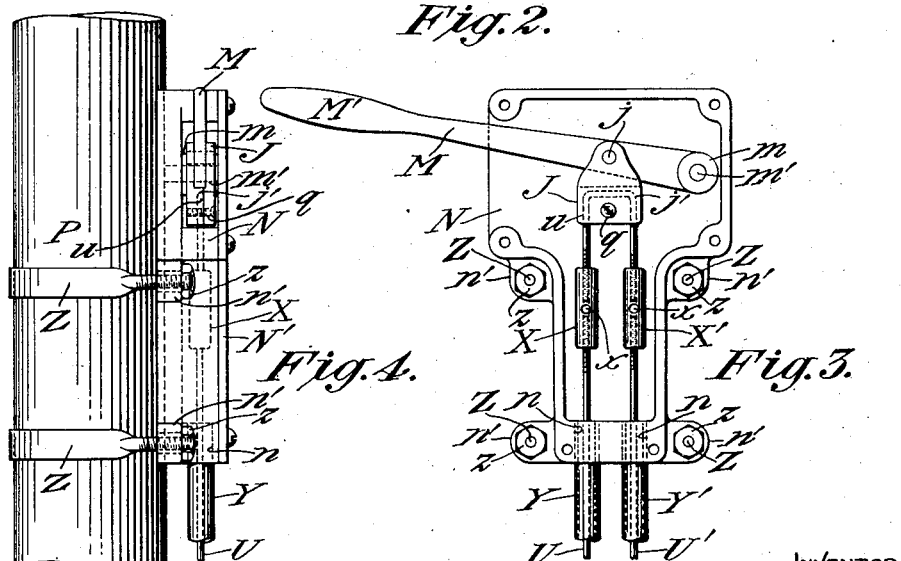

TRUMAN W. POST, OF PROVIDENCE, RHODE ISLAND, ASSIGNOR TO WILLYS CORPORATION, OF TOLEDO, OHIO, A CORPORATION OF DELAWARE.

AUTOMOBILE HEADLIGHT.

1,405,717.          Specification of Letters Patent.     Patented Feb. 7, 1922.

Application filed May 16, 1917. Serial No. 168,936.

*To all whom it may concern:*

Be it known that I, TRUMAN W. POST, a citizen of the United States, and resident of Providence, in the county of Providence, State of Rhode Island, have invented certain new and useful Improvements in Automobile Headlights, of which the following is a specification.

My invention relates to headlights for automobiles or other vehicles and consists of an improved device for shifting the reflector to direct the beam of light downwardly therefrom whereby to prevent the blinding glare from obscuring the vision of an approaching driver or pedestrian.

One object of my improvement is to provide positively-operated means for manipulating the headlight reflector from the operator's station in the car, so arranged as to be easy of access from the driver's seat and under convenient control by a simple movement of the hand.

Another object of the improvement is to provide an automatically-operated switch or cut-out device for the light to indicate the position of the reflector, whereby the operator is prevented from shifting the beam to an insufficient extent.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part thereof, in which:

Fig. 1 is a side view of a portion of an automobile showing my improved headlight applied to use thereon and illustrating the operating-means for the reflector as controlled from a hand-lever located on the steering-post;

Fig. 2, a vertical, sectional view through the center of the headlight showing the operating connections for the reflector and the double-contact switch for the light;

Fig. 3, a front elevation of the hand-lever connections and adjusting-means therefor, showing the casing in which they are enclosed with its cover removed;

Fig. 4, a side view of the same, illustrating the means for securing the casing to the steering-post; and Fig. 5, a view showing a modified form of controlling-device for the reflector-operating means consisting of a push-knob applied to the instrument-board or dash of the car.

Referring first to Fig. 1, C designates the chassis of an automobile comprising the longitudinal side-frames F, on the forward ends of which are standards or forks $f$ for supporting the headlights H. Usually two headlights are used on the machine and their location and arrangement vary somewhat on different types of cars, but for the purpose of the present illustration they are shown in conventional position. In my present improvement both headlights are of the same construction and have the same method of operation so that it will be sufficient to describe one of them in detail.

As illustrated in Fig. 2, each headlight comprises a substantially hemispherical casing or shell S closed at the front by a convex glass lens G secured in its rim $s$. Mounted within the shell S is a parabolic reflector R, which, in accordance with the improvement disclosed in my previous application for U. S. Letters Patent, Serial No. 148,924, filed Feb. 16, 1917, is arranged to be tilted to project the beam of light either horizontally or in a downwardly inclined direction for the purpose as above set forth. A convenient means for mounting the reflector R to adapt it to be tilted or displaced on its axis consists in providing its rim $r$ with oppositely disposed pivots or trunnions $t$ fitted to suitable openings or bearings in the shell S. The electric lamp-bulb L is held in a socket D which projects from the rear of the reflector R, thereby providing for adjustment so that the point of brightest illumination may be set to coincide with the focal point of the reflecting surface. The trunnions $t$ are arranged so that the reflector R will swing upon a horizontal axis and hence the beam of light which is projected therefrom is caused to move in a substantially vertical direction.

At the rear of the shell S is a make-and-break contact-switch K through which the current passes to the lamp L. The switch K consists of a fork-like metal strip formed with two spaced-apart terminals $k$, $k'$ projecting forwardly toward the lamp-socket D. The terminals $k$, $k'$ are adapted to make contact with a metal strip or bar $d$ projecting rearwardly from the socket D, from which it is suitably insulated, and electrically-connected with one of the lamp-contacts. The switch-member K is mounted on the end of an insulating-plug or thimble O held in a sleeve-like bearing $b$ of an adjustable slide B. The slide B is formed with a web $b'$ fitted to the contour of the outside of the headlight shell S and adapted to slide vertically thereon. The central sleeve $b$ of the member B projects through a vertical slot $s'$ in the shell S and its web $b'$ is formed with slots $e$, $e$ adapted to receive the bolts E, E which project from the wall of the shell. Suitable thumb-nuts E', E' on the ends of the bolts E, E serve to clamp the member B in place against the shell S, and by loosening the nuts it may be slid up or down to a limited extent as provided for by the slots $s'$ and $e$, $e$. Through this arrangement the range of tilting movement of the reflector R may be adjusted between fixed limits in the manner and for the purpose as more fully explained hereinafter.

In Fig. 2 the electrical connections for the lamp L are shown as comprising two wires $w$, $w'$, leading from the battery, generator or other source of current through a conduit W. One wire $w'$ is grounded in the shell S at $g$ and the other $w$ leads through the insulating plug O and is connected to the switch-terminals $k$, $k'$. It will thus be seen that with the reflector R tilted into either of the opposite positions shown by the full and dotted lines in Fig. 2, the contact $d$ will be engaged with one of the terminals $k$ or $k'$ of the switch K, so that the light L will receive the electrical current therethrough. This construction of the switch K provides that the reflector R must be shifted the full distance in order for the lamp L to receive the current for its illumination, the purpose of the arrangement being to guard against insufficient downward inclination of the light-beam as more fully explained hereinafter.

The means for tilting the reflector R on its trunnions $t$, $t$ comprises, essentially, a longitudinally slidable wire-connection U extending to a hand-lever or other manually-operable device at the driver's station. Referring still to Fig. 2, a flat, metal band V is clamped around the socket D at the rear of the deflector R with the end of the operating wire U hooked around its binding-screw $v$. The wire U extends through a tube Y which leads along the chassis of the car to the steering-post P, or to any other convenient location as desired, see Fig. 1. As shown more particularly in Fig. 2, the forward end of the tube Y is inserted through a bearing $y$, riveted to the under side of the shell S of the headlight H, and secured therein by a set-screw $y'$. Below the bearing $y$ the tube is bent rearwardly in a wide curve to lead it alongside the frame-member F, to which it may be secured by suitable clamping-means, not herein shown or described. From the chassis-frame F the tube leads up along the steering-post P and it is to be understood, of course, that when two headlights are used, as is the general practice, both lights will have the same arrangement of tubes leading therefrom on opposite sides of the car. The steering-post P may be on either side of the chassis C, and in the case of the light farthest removed therefrom its tube Y' extends across the space between the side-frames F at the rear of the engine, or above the cylinders, if preferred, and thence leads up the post in parallel relation with the other tube Y, see Fig. 3.

Referring now to Figs. 3 and 4, both tubes Y, Y' are joined at their upper ends to a box or casing N in which the hand-lever M is pivoted. The casing N is preferably of substantially T-shape in front elevation, as shown in Fig. 3, and the tubes Y, Y' are fitted to circular openings $n$, $n$ at its lower end. Projecting from the sides of the casing N are suitable lugs $n'$, $n'$ adapted to receive the threaded ends of two loop-like straps Z, Z which are bent around the steering-post P with nuts $z$, $z$ at their ends serving to clamp the casing firmly against the front of the post as shown in Fig. 4. The lever M is formed at one end with a hub $m$ pivoted on a pin $m'$, projecting from the rear wall of the casing N, and is held in place by the cover N' screwed to the front of the casing as shown in Fig. 4. At its opposite end the lever M is provided with a handle M' which projects through an opening in the side of the casing N. Pivoted on a pin $j$ driven through the lever M is a two-part clamp-member J through which the wires U, U' are connected to the lever to be operated therefrom. The member J is preferably constructed with one of its halves formed with a U-shaped groove $j'$ in which a length of wire $u$ is inserted as shown in Fig. 4. A binding-screw $g$ extends through the two parts of the member J to bind the halves together to clamp the wire $u$ fixedly therein. The two ends of the wire $u$ projecting from the member J are threaded to receive turnbuckles X, X' which are screwed onto the ends of the main wires U, U' to provide a connection therebetween. The turnbuckles X and X' have right- and left-hand threads at their opposite ends and are provided with transverse holes $x$ at the center for receiving a pin or other tool for turning them. Through this arrangement the length of the wires U, U' may be adjusted to take up the slack and to equalize their action on the reflectors R to which they are connected, the member J serving as an equalizing-device to provide for the same extent of movement by both of the wires under the thrust or pull of the lever M. The method of operation of the complete apparatus is as follows:

The two headlights H are set in fixed position at the front of the car with the tubes Y, Y' connected to their shells S by means of the bearings y shown in Fig. 2. From the headlights H the tubes Y, Y' lead to the casing N on the steering-post P with as few bends as possible, being clamped fixedly to the frame-members F at different points therealong, or attached to some other rigid part of the chassis C in any convenient manner. At their upper ends the tubes Y, Y' are fixedly connected to the casing N, which is clamped to the steering-post P by means of the straps Z, Z, at a point below the steering-wheel Q within easy reach of the operator's hands. The two operating-wires U, U' are inserted through the tubes Y, Y' with their forward ends connected to the reflectors R by means of the bands V, see Fig. 2, and their opposite ends coupled to the hand-lever M. After the wires U, U' have thus been connected, the turnbuckles X, X' are adjusted to take up the slack and to provide for an equalized relation between the two reflectors R of the headlights. During this adjustment the switch-members K at the rear of the headlight-shells S are set so that when the reflectors R are in substantially horizontal position the terminals d of the lamps L will be in engagement with the lower terminals k of the switches. The switches K are adjusted in position by loosening the thumb-nuts E', E' to allow them to be slid up or down on the shells S as before explained. This adjustment provides for setting both reflectors so that the beams of light therefrom will be projected forward at the same level, thereby overcoming any inequalities due to misalinement of the supporting-means for the lights. After the reflectors have thus been alined in relation by adjusting the terminal-switches K, the connecting-wires U, U' are tightened with the lever M in raised position as shown in Fig. 3. It will be understood, of course, that the switches K are wired to the battery or other source of current, and the method of their electrical connection may be varied in accordance with any preferred practice.

With the parts of the apparatus arranged as above described the device operates as follows: Normally, the reflectors are maintained in the position shown by full lines in Fig. 2 with the beam of light projected horizontally in front of the car to provide the maximum range of illumination. When, however, it is desired to prevent the glare of the lights from blinding or obscuring the vision of an approaching pedestrian or driver the beam may be directed downwardly upon the road so that the brightest rays will fall below the level of the person's eyes. This is easily and quickly accomplished by simply depressing the lever M. The downward movement of the lever slides the wires U, U' through their inclosing tubes Y, Y' and their thrust is communicated to the base of the reflector R to tilt the latter on its trunnions t, t. When the reflector is tilted upwardly at its rear end as shown by the dotted lines in Fig. 2, the axis of the beam of light reflected from the lamp L will be correspondingly tilted downwardly. In this way the light is thrown down onto the road so that its strongest rays fall below the line of vision of a person facing it, thus preventing the objectionable glare while still affording sufficient illumination for a considerable distance in front of the car. In this manner the danger of blinding or confusing the sight of the person in front of the vehicle is avoided, without cutting off the necessary illumination as is the case with the usual dimmer attachments now in general use. My improved device therefore has the advantage of providing a full illumination of the road in front of the car without obstructing the vision of a person approaching from the opposite direction.

As the operator shifts the reflector from one position to the other there will be a brief interval during which the current is cut off from the lamp L as the terminal d passes from one contact k of the switch K to the other contact k'. This interval is so short, however, as to be practically imperceptible, as far as the illumination is concerned, since the incandescence of the light filament will continue for an instant during the slight break in the current. Should the operator fail to move the hand-lever M the full distance, however, the light will be entirely cut off as a warning against an insufficient movement of the reflector. The purpose of this automatic indication of the extent of movement of the reflectors is to prevent the driver from leaving the lights in such position that they still throw a glare above the line of vision of a person in front when it is the intent to entirely remove the glare. In other words, the provision of the automatic switch guards against carelessness on the part of the operator and insures an efficient action of the device for the purpose intended.

In Fig. 5, I have illustrated a modified arrangement of the hand-operated means for shifting the light-reflectors R. In this embodiment of the invention the wires U, U' are connected to a push-rod 2 which is slidable through the instrument-board 3 or the dash of the car. As here shown the instrument-board 3 is represented as being constructed in the form of a sheet-metal panel which is usually located in inclined position beneath the cowl which surmounts the dash of the car. A threaded bushing or sleeve 4 is inserted through an opening in the board 3 and secured in place by the nut 5 and washer 6. The rod 2 slides in the bore of the sleeve 4 and is formed at one end with a knob 7 and at the other with a cross-slot 8. The wires U, U' are secured in the slot 8 by means of the binding-screw 9, and preferably they are connected by turnbuckles, not here shown, to the ends of the wires which lead to the reflectors R in the headlights H to provide for their adjustment as before explained. By pushing or pulling on the knob 7 the wires U, U' are slid longitudinally of their tubes to rock the reflectors in the manner as above explained. It should perhaps be explained that with either arrangement of hand-lever or push-rod the friction of the wires against the sides of their enclosing tubes provides a sufficient detent action to retain the reflectors in their different positions. That is to say, after the reflectors have once been moved to one position or the other the resistance of the wires against sliding movement in their tubes will suffice to hold them in place with the switch K closed, so that under ordinary conditions no other detent is required.

Various other modifications might be made in the form and construction of the parts of my improved device without departing from the spirit or scope of the invention; therefore, without limiting myself to the exact embodiment shown and described, what I claim is:—

1. In an automobile headlight, the combination with a rockable reflector adapted to be tilted downwardly to prevent the glare from its beam of light obstructing the vision of a person in front thereof, of an electric lamp in said reflector having a terminal, a make-and-break switch having spaced-apart terminals for engaging with the lamp-terminal to complete the circuit therefor, and manually-controlled means for rocking the reflector to shift the lamp from one terminal to the other on the switch so that when the reflector is shifted an insufficient extent for the purpose intended the switch will act to cut off the current whereby to extinguish the light to warn the operator.

2. In a headlight, the combination with the shell thereof, of a reflector pivoted therein to adapt it to rock on a horizontal axis, an electric lamp mounted at the rear of the reflector, a terminal contact-member projecting rearwardly therefrom, a cut-out switch formed with spaced-apart contacts adapted to be engaged by the lamp, a source of current connected in circuit with the switch, and manually-controlled means for rocking the reflector to shift the lamp-terminal between the opposite contacts of the switch to direct the beam of light downwardly to a predetermined extent to reduce the glare therefrom while causing a break in the electric circuit to cut off the light whenever the reflector is shifted to an insufficient extent for the purpose described.

3. In an automobile headlight, the combination with a rockable reflector adapted to be tilted to project the beam of light in a downwardly inclined direction, of a lamp mounted in the reflector, a terminal projecting therefrom, a switch having spaced-apart contacts between which the lamp-terminal swings to limit its tilting movement, means to adjust the switch in position in relation to the reflector to control the range of movement of the latter, and means to operate the reflector from the driver's station on the automobile.

4. In an automobile headlight, the combination with the shell thereof, of a reflector pivoted in the shell to adapt it to rock on a horizontal axis, a lamp mounted in said reflector with its terminal projecting rearwardly therefrom, a slide adjustable up and down on the shell adjacent the lamp in the reflector, a switch on said slide having contact-prongs extending on opposite sides of the lamp-terminal to contact therewith while acting to limit the extent of rocking movement of the reflector, and means controlled from the driver's station on the automobile to rock the reflector to shift the lamp-terminal from one contact to the other on the switch.

5. In a headlight, the combination with the shell thereof, of a reflector pivoted within the shell adapted to rock on a horizontal axis, means for moving the reflector upon its pivot, an electric lamp within said reflector having a terminal projecting therefrom, and a switch adjustable vertically upon said shell and having spaced contacts adapted to be engaged by said lamp terminal when said reflector is moved from one position of adjustment to another.

6. In a headlight, the combination with the shell thereof, of a reflector pivoted within the shell and adapted to rock upon a horizontal axis, means for moving the reflector upon its pivot, an electric lamp in said reflector having a terminal projecting therefrom into said shell, and a switch upon the shell adjustable vertically thereon and adapted to engage said lamp terminal to limit the movement of the reflector within the shell.

In testimony whereof I affix my signature.

TRUMAN W. POST.